United States Patent [19]

Wu et al.

[11] Patent Number: 5,227,773
[45] Date of Patent: Jul. 13, 1993

[54] HIGH-INTENSITY LIGHT DISPLAY DEVICE

[75] Inventors: Wei-Yu Wu, Calabasas; Joseph L. Schmid, Reseda, both of Calif.

[73] Assignee: Hughes Aircraft Company, Los Angeles, Calif.

[21] Appl. No.: 725,216

[22] Filed: Jun. 26, 1991

Related U.S. Application Data

[63] Continuation of Ser. No. 357,512, May 25, 1989, abandoned.

[51] Int. Cl.⁵ .............................................. G09G 3/16
[52] U.S. Cl. ......................... 340/815.07; 340/815.17; 340/815.31; 362/31; 40/546
[58] Field of Search ................ 340/815.06, 815.07, 340/815.15, 815.16, 815.17, 479, 464, 815.31, 815.32, 815.33, 784; 362/260, 310, 325, 354, 31; 40/443, 546; 264/162; 359/15, 30–32, 36, 48, 49, 50

[56] References Cited

U.S. PATENT DOCUMENTS

| | | |
|---|---|---|
| 3,686,543 | 8/1972 | Nyul . |
| 3,934,148 | 1/1976 | Collins . |
| 4,059,916 | 11/1977 | Tachihara et al. .................... 362/31 |
| 4,165,930 | 8/1979 | Matsumoto et al. ................ 350/3.85 |
| 4,201,450 | 5/1980 | Trapani ................................ 350/374 |
| 4,285,889 | 8/1981 | Parsons ................................ 264/162 |
| 4,432,039 | 2/1984 | Cibie ..................................... 362/31 |
| 4,680,679 | 7/1987 | Dilouya ................................. 362/61 |
| 4,688,900 | 8/1987 | Doane et al. ......................... 350/347 |
| 4,697,365 | 10/1987 | Moosbrugger et al. .............. 40/546 |
| 4,703,572 | 11/1987 | Chapin ................................. 40/443 |
| 4,726,662 | 2/1988 | Cromack .............................. 350/345 |
| 4,728,547 | 3/1988 | Vaz et al. .............................. 428/1 |
| 4,729,072 | 3/1988 | Oroza ................................... 362/61 |
| 4,734,675 | 3/1988 | Wen ...................................... 362/61 |
| 4,751,493 | 7/1988 | Miller .................................... 362/61 |
| 4,798,448 | 1/1989 | Van Raalte .......................... 350/345 |
| 4,806,903 | 2/1989 | Rust ...................................... 340/464 |
| 4,808,968 | 2/1989 | Caine .................................... 362/61 |
| 4,811,507 | 3/1989 | Blanchet .............................. 40/546 |
| 4,838,661 | 6/1989 | McKee et al. ........................ 350/345 |
| 4,870,484 | 9/1989 | Sonehara .............................. 340/784 |
| 4,892,369 | 1/1990 | Moss ..................................... 350/3.7 |
| 4,918,577 | 4/1990 | Furudate ............................... 362/31 |
| 4,975,809 | 12/1990 | Ku ......................................... 362/31 |
| 4,989,956 | 2/1991 | Wu et al. ............................... 40/546 |
| 5,005,108 | 4/1991 | Pristash et al. ...................... 362/31 |
| 5,036,435 | 7/1991 | Tokuda et al. ....................... 362/31 |

FOREIGN PATENT DOCUMENTS

| | | |
|---|---|---|
| 1580461 | 9/1969 | France . |
| 2576566 | 8/1986 | France . |
| 284681 | 12/1952 | Switzerland .................... 340/815.31 |
| 948379 | 2/1964 | United Kingdom . |
| 2003289 | 3/1979 | United Kingdom . |

OTHER PUBLICATIONS

G. Baur et al, "Fluorescence-activated liquid-crystal display", Applied Physics Letters, vol. 31, No. 1, Jul. 1, 1977, pp. 4–6.

(List continued on next page.)

*Primary Examiner*—Richard Hjerpe
*Attorney, Agent, or Firm*—V. D. Duraiswamy; W. K. Denson-Low

[57] ABSTRACT

A display device which is especially suited for application as a center-high-mounted stop-light (CHMSL) or brake light for an automotive vehicle includes a white linear light source. A coupler panel or sheet formed of a fluorescent dye-doped material couples light from one edge therethrough to an opposite edge from the light source to a light receiving edge of a display panel. The coupler panel transmits red light therethrough, absorbs other colors of light, and re-emits the absorbed light as red light. The display panel has a first surface formed with optical quality, light reflecting grooves, which reflect and disperse the edge coupled light out a second surface which is opposite to the first surface. Each groove includes a series of laterally spaced curved light dispersing depressions. The display panel viewed from the first surface is transparent at all times. The display panel viewed from the second surface produces a red light pattern reflected from the grooves when the light source is turned on, and appears transparent when the light source is turned off.

29 Claims, 4 Drawing Sheets

OTHER PUBLICATIONS

S. Sato et al, "Multicolor fluorescent display by scattering states in liquid crystals", J. Appl. Phys. 52(6), 1981, pp. 3941–3948.

A. Goetzberger et al, "Solar Energy Conversion with Fluorescent Collectors", Applied Physics 14, 1977, pp. 123–139.

The Following Documents are Marketing Documents Distributed by Mobay Corporation: "A Little Light Goes a Long Way With Lisa".

"Light-Collecting Plastics—A Brilliant Idea", Provisional Information Sheet.

Steven Ashley, "Razzle-Dazzle Plastic", Popular Science, pp. 100–101.

Technishe Rundschau, No. 36, 2nd Sep. 1988, p. 15, Bern. CH; "Kunststoff sammelt Licht".

V. Elaine Gilmore, "Piping Light", Popular Science, May, 1988, pp. 76–79, 117.

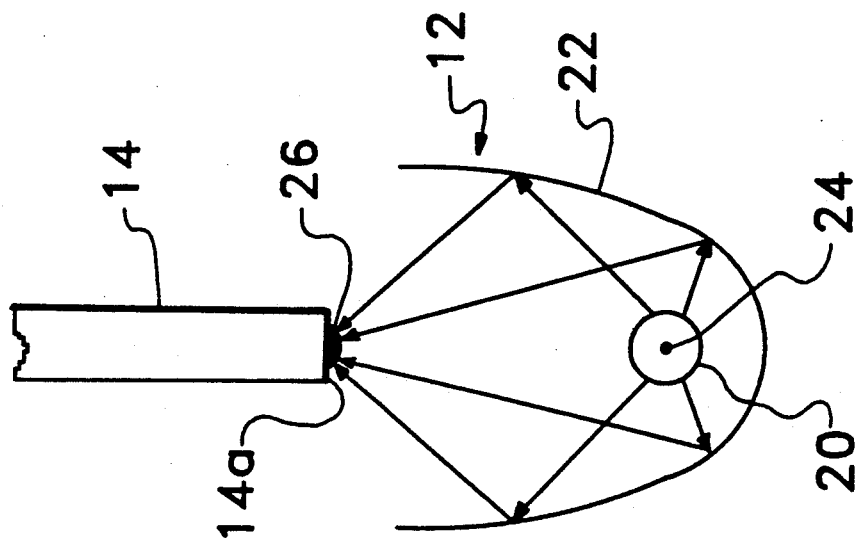
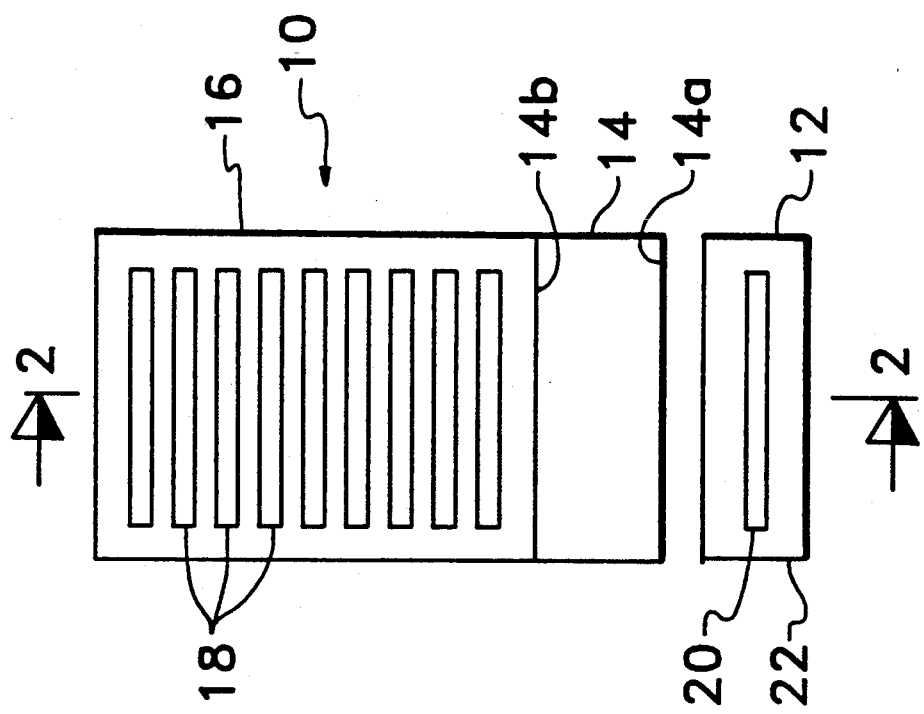

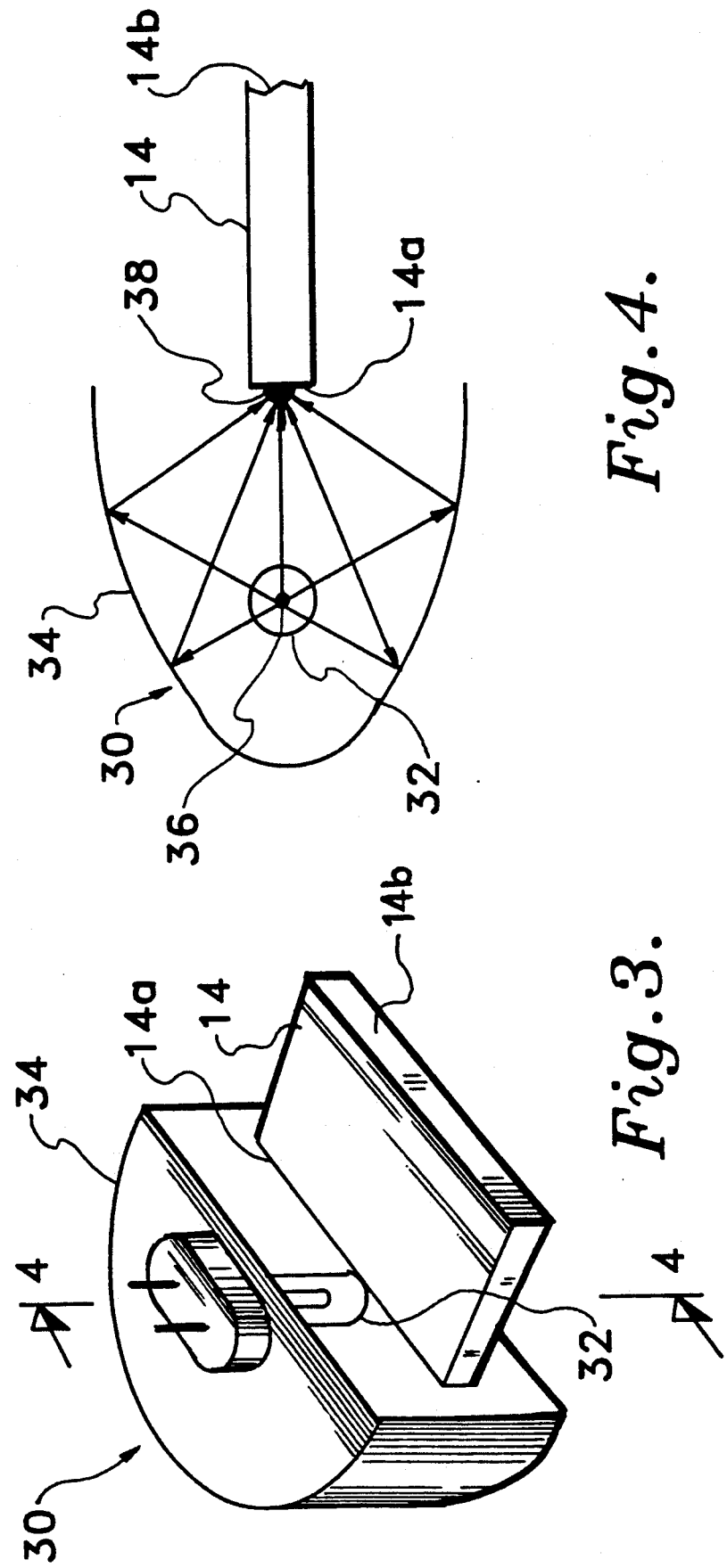

HIGH-INTENSITY LIGHT DISPLAY DEVICE

This is a continuation of application Ser. No. 07/357,512, filed May 25, 1989, now abandoned.

CROSS REFERENCE TO RELATED APPLICATION

The present application is related to copending U.S. patent application Ser. No. 07/293,875, entitled "VISUAL DISPLAY DEVICE WITH FLUORESCENT DYE-DOPED EDGE-ILLUMINATING EMITTER PANEL", filed Jan. 4, 1989, by Wei-yu Wu et al. The related application is assigned to the Hughes Aircraft Company, the same assignee as the present application.

BACKGROUND OF THE INVENTION

1. Field of the Invention

The present invention generally relates to visual displays, and more specifically to a red light display device which is especially suited to automotive center-high-mounted stop-light (CHMSL) and brake light applications.

2. Description of the Related Art

Red colored CHMSLs for automotive vehicles are becoming increasingly popular due to the greatly increased safety margin that they provide. In addition to the conventional right and left mounted, red-colored rear brake lights, newer vehicles and retrofit packages for older vehicles are available which include the CHMSL in the form of a third brake light which is mounted near the top of the vehicle rear window. Depression of the vehicle brake pedal causes the CHMSL to be illuminated in combination with the two low mounted brake lights to form a triangle pattern with greatly enhanced visibility and ability to immediately attract the attention of the operator of a trailing vehicle. Statistics have already proven that CHMSLs have prevented numerous traffic accidents in situations requiring emergency braking under high speed, congested traffic conditions.

A major problem which has persisted in providing a CHMSL on a conventional automotive vehicle is that existing devices generally include an opaque housing having a rear-facing translucent red panel with a white illuminating bulb inside the housing which is wired to the vehicle's brake circuit. The opaque housing itself constitutes a safety hazard in that it blocks a portion of the view through the rear window which the vehicle operator must see via the rear-view mirror in order to monitor the proximity of other vehicles. The opaque housing or at least a light blocking member behind the illuminating bulb and red panel is necessary to prevent the vehicle operator from confusing the CHMSL with a light from another vehicle.

Conventional CHMSLs and brake lights including a white bulb, and a red display panel which constitutes a red filter, are inefficient in that only the red component of light from the bulb is transmitted through the panel. All other colors or wavelengths of light are absorbed by the panel and thereby wasted. The result is that the intensity of the red light emitted by the device is considerably lower than the intensity of white light emitted by the bulb.

SUMMARY OF THE INVENTION

The present invention includes a linear white light source such as an elongated tungsten-halogen lamp. A coupler panel or sheet formed of a fluorescent dye-doped material couples light from one edge therethrough to an opposite edge from the light source to a light receiving edge of a display panel. The coupler panel transmits red light therethrough, absorbs other colors of light, and re-emits the absorbed light as red light. The resulting improvement over conventional red light display devices such as CHMSLs and brake lights is that color components of the white light from the source, such as blue and green, are converted to red, added to the transmitted red light component, and coupled into the display panel. Thus, the present device produces a high intensity red light output from a white light source than has been possible in the prior art, by converting heretofore wasted blue and green light into red light.

The display panel has a first surface formed with optical quality, light reflecting grooves, which reflect and disperse the edge coupled light out a second surface of the display panel which is opposite to the first surface. Each groove includes a series of laterally spaced curved light dispersing depressions. The display panel viewed from the first surface is transparent at all times. The display panel viewed from the second surface produces a red light pattern reflected from the grooves when the light source is turned on, and appears transparent when the light source is turned off. The design of the light reflecting grooves of the display panel minimizes absorption of light in the display panel, thereby further increasing the intensity of the red light display.

The light source and display panel of the present display device are simple in structure, highly efficient, and inexpensive to manufacture on a commercial production basis. They may be used in combination with each other, or individually as elements in other types of display devices, such as large exhibition displays. It has been determined experimentally that a display device of the present invention configured as a CHMSL provides a red light display having an intensity substantially in excess of federal requirements.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1 is a front elevational view of a high intensity, red light display device of the present invention;

FIG. 2 is a fragmentary sectional view taken on a line II—II of FIG. 1;

FIG. 3 is a perspective view of an alternative light source and coupler panel;

FIG. 4 is fragmentary sectional view taken on a line IV—IV of FIG. 3;

DETAILED DESCRIPTION OF THE INVENTION

Figure 6:
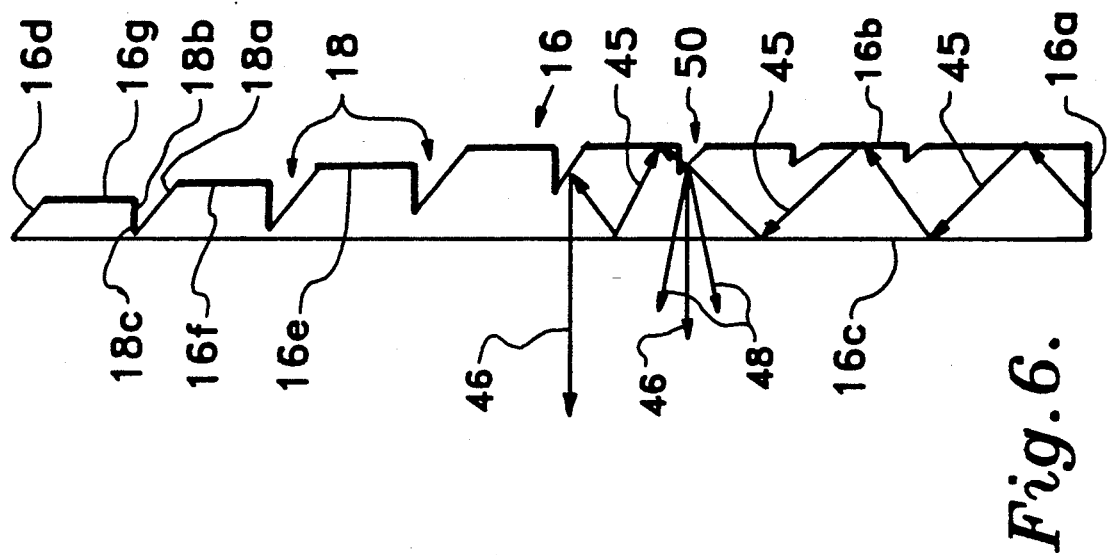
FIG. 6 is a vertical sectional view of a visual display panel of the present invention.

Referring now to FIGS. 1 and 2 of the drawing, a high intensity, red light visual display device of the present invention is generally designated as 10 and includes a linear light source 12, a coupler panel 14, and a visual display panel 16. The light source 12 generates a beam of light in the form of a thin line which is transmitted through the coupler panel 14 into the display panel 16. The panel 16 is made of a transparent material, and formed with a series of parallel light reflecting grooves 18. Light introduced into the panel 16 through a lower edge thereof as viewed in FIG. 1 propagates upwardly through the panel 16 and is reflected by the grooves 18 out through a surface of the panel 16 which is opposite to the surface in which the grooves are formed (perpendicular to the plane of the drawing).

When the light source 12 is not turned on, the panel 16 is transparent when viewed through both surfaces. The panel 16 is transparent when viewed through the surface in which the grooves 18 are formed under all conditions. When the light source 12 is turned on, the display panel 16 viewed from the surface opposite to the surface in which the grooves 18 are formed produces a pattern of red light. The grooves 18 appear red due to the light reflected therefrom, and the parallel spaces between the grooves 18 appear transparent.

As best seen in FIG. 2, the light source 12 includes an elongated tungsten-halogen lamp 20 which emits high intensity, white light. A reflector 22 having an elliptical cross-section or profile is mounted behind the lamp 20. The lamp 20 is located at a first focus 24 of the reflector 22, whereas an image of the lamp 20 is projected onto an input edge 14a of the coupler panel 14 which is located at a second focus 26 of the reflector 22. If desired, the reflector 22 may be omitted, or replaced with a semicylindrical or other suitable reflector. The light is transmitted or coupled through the coupler panel 14 from the input edge 14a to an output edge 14b thereof into the display panel 16.

An alternative light source 30 according to the present invention is illustrated in FIGS. 3 and 4 and includes a tungsten-halogen lamp 32 which constitutes a point white light source. A para-elliptical reflector 34 is mounted behind the lamp 32 for projecting a light image thereof converted to the form of a thin line into the input edge 14a of the coupler panel 14 in the same manner as the light source 12. The profile of the reflector 34 viewed from the side as in FIG. 4 is elliptical, whereby a vertical image of the lamp 32 disposed at a first focus 36 of the reflector 34 is focussed at the input edge 14a of the coupler panel 14, which is disposed at a second focus 38 of the reflector 34. This is equivalent to the operation of the elliptical reflector 22 in the embodiment of FIG. 2.

The profile of the reflector 34 viewed from above is parabolic, whereby the image of the lamp 32 is converted from a point into a thin line in the horizontal plane. The orthogonal elliptical and parabolic profiles of the reflector 34 in combination produce a linear light image of a point light source which is equivalent to the image produced by the light source 12 of FIGS. 1 and 2.

The coupler panel 14 may be rigid or flexible, and is preferably in the form of an acrylic or polycarbonate polymer phosphor plastic sheet or film which may be bent in any desired direction, with a fluorescent dye dispersed therein. The film is known in the art per se and is commercially available under the tradename of "LISA-Plastics" from the Mobay Chemical Corporation. The low-molecular weight stable polymer dyestuff, mixed into a transparent substrate or host medium, absorbs ambient light and emits it as longer wavelength visible light. The fluorescent dyes do not strongly reabsorb the longer wavelengths they emit, so more light is channeled to the edges.

Flourescent dye-doped polymer films such as LISA films are conventionally used for collecting light over a large surface area and emitting the light through an edge of the film. Such an application is described in a paper entitled "Solar Energy Conversion with Fluorescent Collectors", by A. Goetzberger and W. Greubel, published in Journal of Applied Physics, Vol. 14, 1977, pp. 123–139. This paper describes the properties of fluorescent dye-doped polymer films for the express purpose of absorbing light over a large surface area and channeling the internally emitted light out through an edge of the material to solar energy storage means.

A drawback of using a fluorescent dye-doped panel or film with surface illumination is that light having a relatively long wavelength, especially red, is transmitted through the material. Although shorter wavelength blue and green light are absorbed and re-emitted as red light, the original red component incident on the film is lost and thereby wasted. This is especially undesirable in a CHMSL or brake light application, where the desired output color is red.

Figure 5:
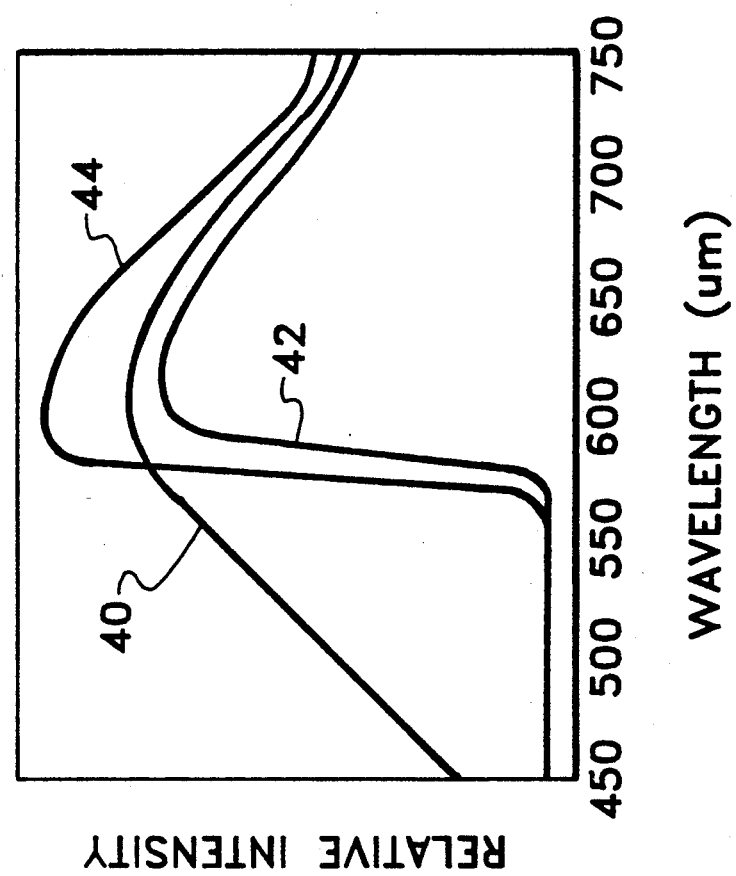
FIG. 5 is a graph illustrating the spectral properties of a coupler panel of the present display device.

A curve 40 in FIG. 5 illustrates the spectral distribution of light from a tungsten-halogen white light source passed through a plastic sheet made of the same host material as a LISA film. A curve 42 represents conditions similar to those for the curve 40, except that a red filter was placed in front of the light source. The curve 42 differs from the curve 40 in that the shorter wavelength components corresponding to blue and green colors (shorter than 550 micrometers) were absorbed by the red filter. In addition, the intensity of red light in the region of 625 micrometers was substantially reduced by the filter.

A curve 44 illustrates a case in which light from the same source used for producing the curves 40 and 42 was passed through a fluorescent dye-doped LISA sheet or film from one edge to an opposite edge thereof. The blue and green components of the light from the lamp are absorbed by the material and re-emitted as red light, whereas the original red light component is transmitted through the material without absorption. As a result, the intensity of the output light in the red wavelength region around 625 micrometers is higher than the red light component in the original white light. Thus, a light source of the present invention produces a high intensity, linear red light image from a point or linear white lamp.

The display panel 16 is shown in FIG. 6 in vertical section and includes a light receiving edge 16a which is optically coupled to the output edge 14b of the coupler panel 14 for receiving the linear red light image therefrom. The light reflecting grooves 18 are formed in a first surface 16b of the panel 16, and extend parallel to the edge 16a. The light propagates through the panel 16 from the edge 16a upwardly as viewed in FIG. 6, is reflected by the grooves 18, and exits the panel 16 through a second surface 16c thereof which is opposite to the first surface 16b. An edge 16d of the panel 16 opposite to the edge 16a is cut at an angle. Propogation through the panel 16 is caused by total internal reflection from the surfaces 16b and 16c as illustrated by arrows.

Each groove 18 has an angled, reflecting wall 18a and a perpendicular wall 18b which meet at a bottom 18c. In accordance with the invention, the bottoms 18c of the grooves 18 are progressively closer to the surface 16c as the distance from the receiving edge 16a increases. This is provided by cutting the grooves 18 progressively deeper as the distance from the edge 16a increases. The surfaces 16b and 16c may be coextensively parallel to each other. Alternatively, the surface 16b may be formed with steps 16e, 16f and 16g such that the surface 16b is stepped inwardly from the edge 16a toward the surface 16c. The purpose of this is to make the intensity of red light reflected out the panel 16 evenly distributed in the vertical direction as viewed in FIG. 6. If the grooves 18 were equal in depth, the intensity of reflected light would be greater at the bottom of the panel 16 than at the upper portions thereof.

The edge 16d is cut at the same angle as the walls 18a of the grooves 18. Light reflected from the walls 18a exits the surface 16c in a multiple mode configuration, with a central major direction 46 at which the light intensity is maximum. Light also exits the surface in a angular range 48 clustered around the major direction 46, with the intensity progressively decreasing as the angle from the major direction 46 increases. The angle of the walls 18a is selected in accordance with the orientation of the panel 16 and the desired major direction relative thereto. In an application where the panel 16 is oriented vertically, the walls 18a may be cut at a 45° angle. In an application such as a CHMSL mounted on a slanted rear window of an automotive vehicle, the angle of the walls 18a would be cut at a different angle selected such that the major direction of reflected red light would point directly toward vehicles approaching from the rear.

The walls 18b are preferably cut perpendicular to the surface 16c, and function to refract light which exits the panel 16 through the respective angled walls 18a back into the panel 16 as indicated by arrows in an area 50.

In accordance with another important feature of the present invention, the intensity of light emitted by the panel 16 is strongly dependent on the smoothness of the surface 16b, and especially the reflecting walls 18a of the grooves 18. It is desirable that at least the walls 18a have an optical finish, in which the surface roughness is less than ¼ of the wavelength of the light which is to be reflected. Such a finish is difficult and expensive to achieve using conventional manufacturing operations. However, an optical quality finish may be provided by coating the walls 18a, and preferably both surfaces 16b and 16c in their entirety, with an optical cement. The cement fills in small surface imperfections and, when hardened, provides the desired optical quality finish.

The display panel 16 described thus far reflects light out the surface 16c parallel to the plane of the drawing as viewed in FIG. 6, with essentially no lateral dispersion (perpendicular to the plane of the drawing). Such a panel would produce a high intensity red light display for an observer directly behind the panel, but a display with sharply decreasing intensity as the viewing angle increases. It is therefore desirable to provide means for creating dispersion of reflected light in the lateral direction.

Figure 7:
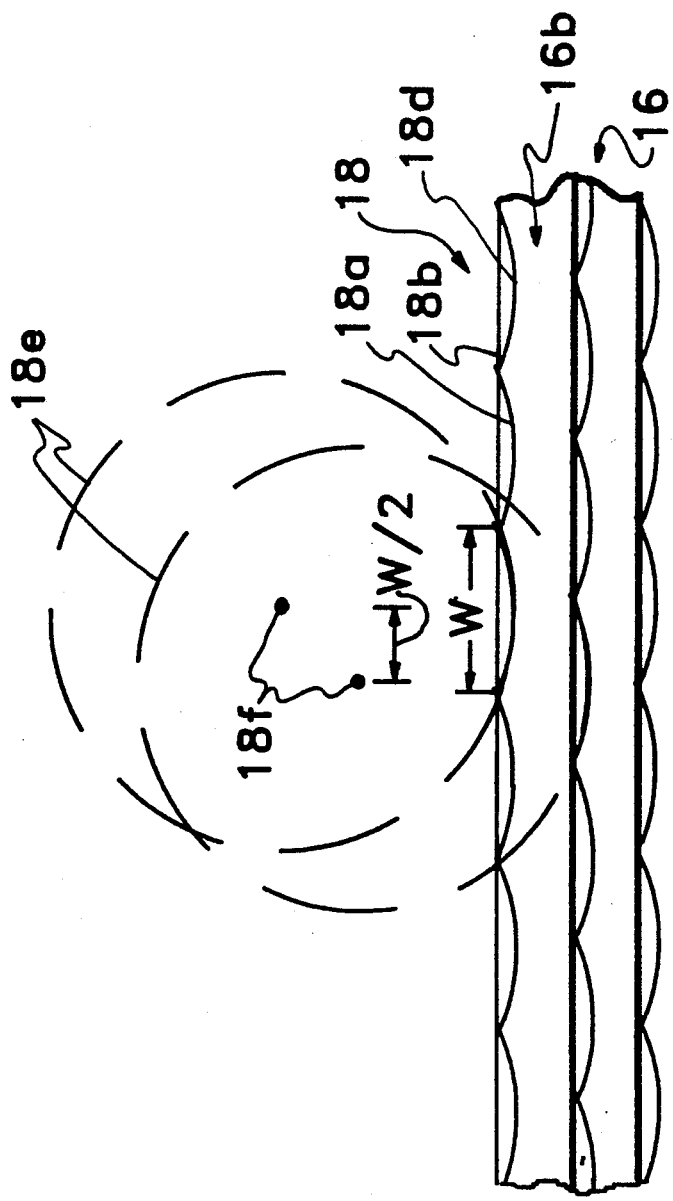
FIG. 7 is a fragmentary plan view of the display panel of FIG. 5.

As illustrated in FIG. 7, the angled wall 18a of each groove 18 is formed with a series of laterally spaced depressions 18d, which appear concave as viewed from the surface 16b and convex as viewed from the surface 16c. The depressions 18d provide continuous variation in the lateral angle of the walls 18a and thereby the desired lateral dispersion of light reflected from the walls 18a.

The depressions 18d preferably have a cylindrical cross-section or profile. As viewed in FIG. 7, each depression 18d is defined by a cylinder 18e having an axis 18f which extends parallel to the plane of the respective wall 18a and edge 16d of the panel 16, which is best seen in FIG. 6, and perpendicular to the grooves 18. In order to provide further dispersion, the depressions 18d formed in the walls 18a of alternating adjacent grooves 18 are laterally displaced from each other by a distance W/2, where W is the width of each depression 18d.

Figure 8:
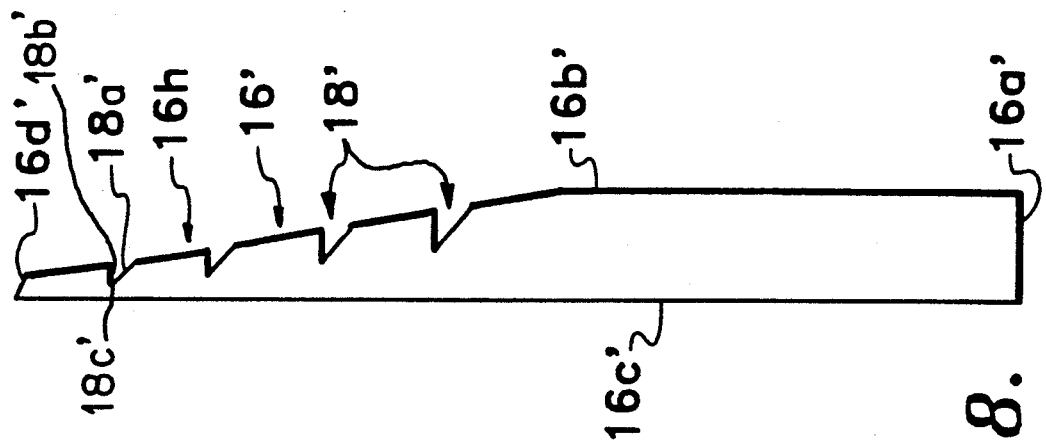
FIG. 8 is a vertical sectional view of an alternative visual display panel of the present invention.

FIG. 8 illustrates an alternative display panel 16' in accordance with the invention, in which corresponding elements are designated by the same reference numerals primed. The first surface 16b' is formed with a tapered portion 16h which tapers inwardly from the light receiving edge 16a' toward the second surface 16c', providing a function similar to the steps 16e, 16f and 16g of the panel 16. The grooves 18' may be of equal depth, since each bottom 18c' thereof is closer to surface 16c' than bottoms of grooves 18' which are closer to the edge 16a', due to the tapered configuration. Typically, the taper angle may be 5° where the angle of the walls 18a' is 45°.

While several illustrative embodiments of the invention have been shown and described, numerous variations and alternate embodiments will occur to those skilled in the art, without departing from the spirit and scope of the invention. For example, although the invention is particularly suited to applications in which a red light display is desired, it is not so limited, and may be adapted to produce a visual display including any desired color. The preferred display panel which has been described and illustrated may be replaced by a hologram, heads-up display, or other suitable display means which is edge-illuminated through the present coupler panel. Further, the present display panel may be utilized in combination with any appropriate linear light source without the intervening coupler panel. Accordingly, it is intended that the present invention not be limited solely to the specifically described illustrative embodiments. Various modifications are contemplated and can be made without departing from the spirit and scope of the invention as defined by the appended claims.

We claim:

1. A visual display device comprising:
   a display panel having a light receiving edge and first and second opposed surfaces, said first surface including at least one light reflecting groove for reflecting light propagating through the display panel from the light receiving edge out through said second panel surface, each light reflecting groove having a first surface that is reflective and faces said light receiving edge to receive light from said light receiving edge, and a second surface on the opposite side of said groove from said light receiving edge, each groove extending at a substantially greater than zero angle to the general direction of light traveling through the panel from said light receiving edge to said groove, said first groove surface reflecting incident light from said light receiving edge out through said second panel surface, said first groove surface each including a series of laterally spaced curved light dispersing depressions, said depressions being formed about respective axes that are generally parallel to said first groove surfaces, said depressions being curved and extending inward into their respective grooves to provide a substantially continuous variation in their angle of reflection as the depressions are laterally traversed, and to thereby provide a dispersion of light reflected from said first groove surfaces, said light dispersion extending generally lateral to the general direction of light traveling from said light receiving edge to said grooves;

linear light source means; and a fluorescent dye doped coupler panel having a first edge which is optically coupled to the linear light source means and a second edge which is optically coupled to the light receiving edge of the display panel.

2. A display device as in claim 1, in which the linear light source means comprises a point light source, and a para-elliptical reflector having orthogonal elliptical and parabolic profiles.

3. A display device as in claim 1, in which the display panel has an angled edge opposite to said light receiving edge, said angled edge extending parallel to said first groove surface.

4. A display device as in claim 1, in which the coupler panel is doped with a fluorescent dye which transmits light of a predetermined color from the first edge to the second edge therethrough, absorbs light of at least one other color coupled thereinto through the first edge, emits light of the predetermined color upon absorption of the light of said at least one other color, and couples said emitted light out the second edge thereof.

5. A display device as in claim 4, in which the predetermined color is red.

6. A display device as in claim 5, in which the light source means emits white light, said at least one other color being at least one color component other than red of the white light emitted by the light source means.

7. A display device as in claim 6, in which the light source means comprises an elongated tungsten-halogen lamp.

8. The visual display device of claim 1, wherein said light dispersing depressions comprise substantially cylindrical arcs.

9. The visual display device of claim 8, wherein the light dispersing depressions of each first groove surface are laterally offset from the light dispersing depressions of adjacent first groove surfaces by approximately half the widths of said depressions.

10. The visual display device of claim 1, said first groove surfaces having substantially parallel inner and outer edges, wherein said light dispersing depressions extend substantially perpendicular to said inner and outer edges.

11. A visual display panel having a light receiving edge and first and second opposed surfaces, said first surface including a plurality of light reflection grooves for reflecting light propagating through the display panel from the light receiving edge out through said second panel surface, each light reflecting groove having a first surface that is reflective and faces said light receiving edge, to receive light from said light receiving edge, and a second surface on the opposite side of said groove from said light receiving edge, each groove extending at a substantially greater than zero angle to the general direction of light traveling through the panel from said light receiving edge to said groove, said first groove surface reflecting incident light from said light receiving edge out through said second panel surface, said first groove surface each including a series of laterally spaced, curved light dispersing depressions, said depressions being formed about respective axes that are generally parallel to said first groove surfaces, said depressions being curved and extending inward into their respective grooves to provide a substantially continuous variation in their angle of reflection as the depressions are laterally traversed, and to thereby provide a substantial lateral dispersion of light reflected from said first groove surfaces, said light dispersion extending generally lateral to the general direction of light traveling from said light receiving edge to said grooves.

12. A visual display panel as in claim 11, in which said first groove surface has an optical quality surface.

13. A visual display panel as in claim 11, in which said first groove surface is coated with a hardened cement which forms an optical quality surface.

14. A visual display panel as in claim 11, wherein said grooves are parallel with each groove extending into the panel closer to the second panel surface than the grooves which are closer to the panel's light receiving edge.

15. A visual display panel as in claim 14, in which said grooves have substantially equal depths, said first panel surface tapering inwardly toward said second panel surface in a direction away from the panel's light receiving edge.

16. A visual display panel as in claim 14, in which said first panel surface is stepped inwardly toward said second panel surface in a direction away from the panel's light receiving edge.

17. The visual display panel of claim 11, wherein said light dispersing depressions comprise substantially cylindrical arcs.

18. The visual display panel of claim 17, wherein the light dispersing depressions of each first groove surface are laterally offset from the light dispersing depressions of adjacent first groove surfaces by approximately half the widths of said depressions.

19. The visual display panel of claim 11, said first groove surfaces having substantially parallel inner and outer edges, wherein said light dispersing depressions extend substantially perpendicular to said inner and outer edges.

20. A visual display panel having a light receiving edge and first and second opposed surfaces, said first surface including at least one light reflecting groove extending parallel to the light receiving edge for reflecting light propagating through the display panel from the light receiving edge out through said second panel surface, said at least one light reflecting groove having a first surface that is reflective and faces said light receiving edge to receive light from said light receiving edge, and a second surface on the opposite side of said groove from said light receiving edge, said first groove surface reflecting incident light from said light receiving edge out through said second panel surface, said first groove surfaces each including a series of laterally spaced curved light dispersing depressions, said depressions being formed about respective axes that are generally parallel to said first groove surfaces, said depressions being curved and extending inward into their respective grooves to provide a substantially continuous variation in their angle of reflection as the depressions are laterally traversed, and to thereby provide a substantial lateral dispersion to light reflected from said first groove surfaces, said light dispersion extending generally lateral to the general direction of light traveling from said light receiving edge to said grooves.

21. A display panel as in claim 20, in which said first groove surface has an optical quality.

22. A display panel as in claim 20, in which the first surface including said at least one light reflecting groove is coated with a hardened cement which forms an optical quality surface.

23. A display as in claim 20, further comprising an angled edge opposite to said light receiving edge, said angled edge extending parallel to said first groove surface.

24. A display panel as in claim 20, comprising a plurality of parallel light reflecting grooves, each parallel groove having a bottom which is closer to the second surface than bottoms of parallel grooves which are closer to the light receiving edge.

25. A display panel as in claim 24, in which the parallel grooves have a substantially equal depth, the first surface tapering inwardly toward the second surface in a direction away from the light receiving edge.

26. A display panel as in claim 24, in which the first surface is stepped inwardly toward the second surface in a direction away from the light receiving edge.

27. A display panel as in claim 20, wherein said light dispersing depressions comprise substantially cylindrical arcs.

28. A display panel as in claim 27, wherein the light dispersing depressions of each first groove surface are laterally offset from the light dispersing depressions of adjacent first groove surfaces by approximately half the widths of said depressions.

29. A display panel as in claim 20, said first groove surfaces having substantially parallel inner and outer edges, wherein said light dispersing depressions extend substantially perpendicular to said inner edges.

* * * * *